(12) United States Patent
Chueh et al.

(10) Patent No.: US 9,048,736 B2
(45) Date of Patent: Jun. 2, 2015

(54) POWER ADAPTOR WITH POWER-SAVING MECHANISM

(75) Inventors: Chin-Sheng Chueh, Taoyuan County (TW); Sheng-Yao Hsu, Taoyuan County (TW); Chia-Tse Yeh, Taoyuan County (TW); Yung-Chun Lin, Taoyuan County (TW); Jiun-Wei Tseng, Changhua County (TW); Po-Wen Wang, New Taipei (TW)

(73) Assignee: Qisda Corporation, Taoyuan County (TW)

( * ) Notice: Subject to any disclaimer, the term of this patent is extended or adjusted under 35 U.S.C. 154(b) by 435 days.

(21) Appl. No.: 13/527,605

(22) Filed: Jun. 20, 2012

(65) Prior Publication Data

US 2012/0327687 A1 Dec. 27, 2012

(30) Foreign Application Priority Data

Jun. 24, 2011 (CN) .......................... 2011 1 0172191

(51) Int. Cl.
*H02M 3/335* (2006.01)
*H02M 1/00* (2006.01)

(52) U.S. Cl.
CPC .. *H02M 3/33507* (2013.01); *H02M 2001/0032* (2013.01); *Y02B 70/16* (2013.01)

(58) Field of Classification Search
CPC ....................................................... H02M 3/335

USPC ......... 363/16, 20, 21.01, 21.07, 21.08, 21.09, 363/21.15, 21.16, 21.17
See application file for complete search history.

(56) References Cited

U.S. PATENT DOCUMENTS

| | | | |
|---|---|---|---|
| 6,111,763 A * | 8/2000 | Hanabusa et al. .......... | 363/21.15 |
| 6,396,718 B1 * | 5/2002 | Ng et al. .................... | 363/21.07 |
| 6,445,598 B1 * | 9/2002 | Yamada .................... | 363/21.12 |
| 6,525,947 B2 * | 2/2003 | Umetsu et al. ............. | 363/21.15 |
| 6,788,556 B2 * | 9/2004 | Hosotani et al. .......... | 363/21.15 |
| 7,200,016 B2 * | 4/2007 | Ogawa ........................ | 363/56.01 |
| 2011/0013431 A1* | 1/2011 | Chiang .......................... | 363/49 |
| 2012/0147631 A1* | 6/2012 | Nate .......................... | 363/21.15 |

FOREIGN PATENT DOCUMENTS

CN 201435679 Y 3/2010

* cited by examiner

*Primary Examiner* — Matthew Nguyen (57) ABSTRACT

A power adaptor includes an inverter, a feedback circuit, a detecting unit, and an adjusting unit. The inverter is configured to convert an input voltage into an output voltage according to a power conversion ratio and adjust the power conversion ratio according to a feedback voltage. The feedback circuit is configured to provide the feedback voltage by voltage-dividing the output voltage according to a specific ratio. The detecting unit is configured to detect a load of an output end of the power adaptor. The adjusting is configured to adjust the specific ratio according to the loading variation of the load.

13 Claims, 6 Drawing Sheets

POWER ADAPTOR WITH POWER-SAVING MECHANISM

BACKGROUND OF THE INVENTION

1. Field of the Invention

The present invention is related to a power adaptor and a power conversion method, and more particularly, to a power adaptor and a power conversion method with a power-saving mechanism.

2. Description of the Prior Art

A power adaptor is configured to convert high-voltage alternative-current (AC) or direct-current (DC) power into low-voltage DC power. Power adaptors are widely used in various electronic devices as power supplies. Common power adaptor structures include flyback, forward and push-pull. Flat-panel devices normally adopt external power adaptor due to limited space.

Figure 1:
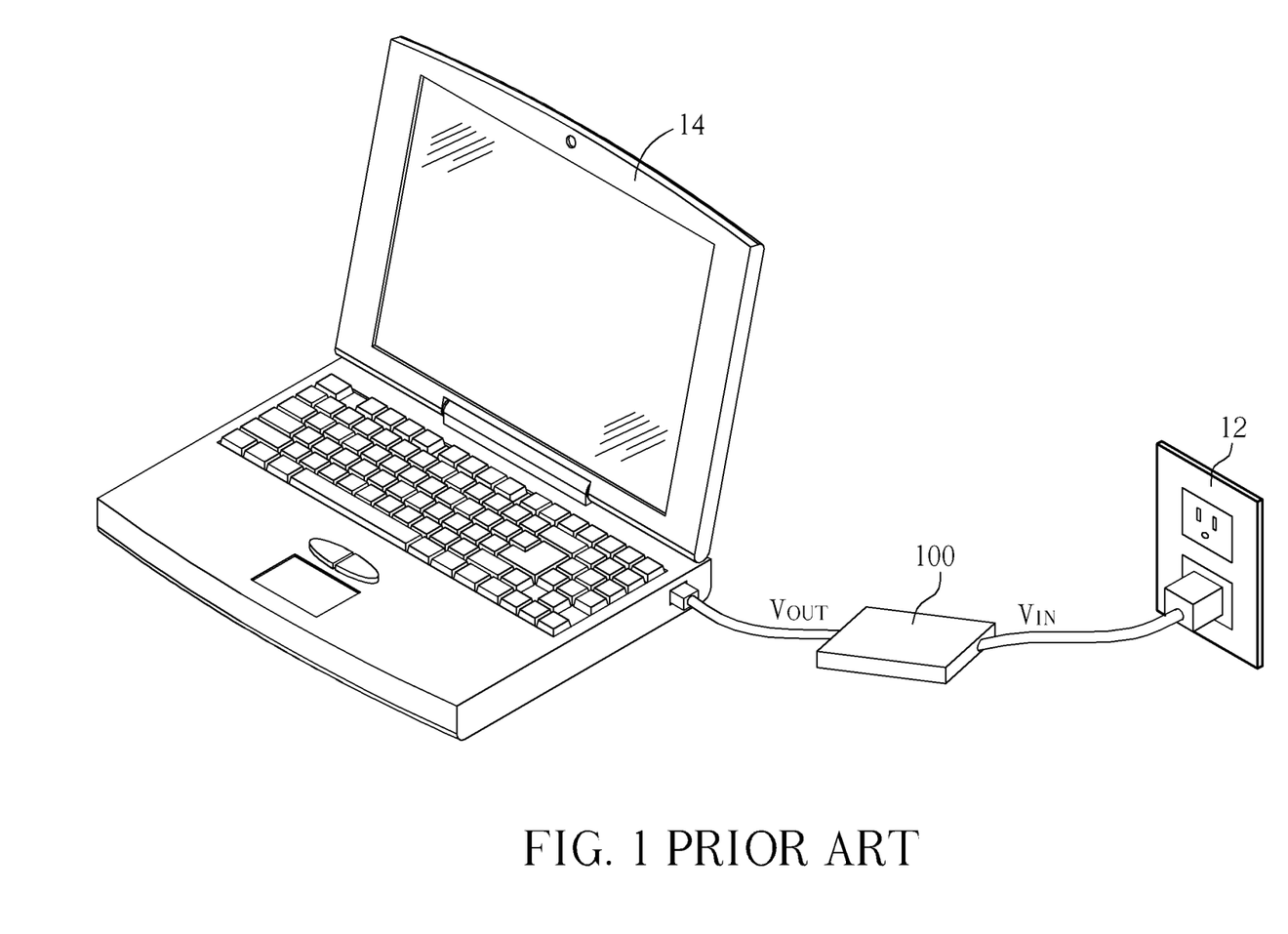
FIG. 1 is a diagram illustrating a prior art external power adaptor in operation.

FIG. 1 is a diagram illustrating a prior art external power adaptor 100 in operation. The power adaptor 100 is configured to convert an input voltage $V_{IN}$ provided by an AC power 12 into an output voltage $V_{OUT}$ for operating a loading device 14. The loading device 14 may be a notebook computer or a liquid crystal display panel which requires a lower operating voltage in a power-saving mode and a higher operating voltage than in a normal mode. The power conversion ratio ($V_{OUT}/V_{IN}$) of the prior art external power adaptor 100 is determined by the voltage required for operating the loading device 14 in the normal mode, and remains constant whether the loading device 14 functions as a heavy load (normal mode) or a light load (power-saving mode). Therefore, when the loading device 14 enters the power-saving mode, the prior art power adaptor 100 may provide the output voltage $V_{OUT}$ higher than required, thereby causing excessive power consumption.

SUMMARY OF THE INVENTION

The present invention provides a power adaptor with a power-saving mechanism. The power adaptor includes an inverter, an output end, a feedback circuit, and an adjusting unit. The inverter is configured to convert an input voltage into an output voltage according to a power conversion ratio and adjust the power conversion ratio according to a feedback voltage associated with the output voltage. The inverter includes a first winding coil disposed on a primary side of the power adaptor for receiving the input voltage and a second winding coil disposed on a secondary side of the power adaptor for providing the output voltage. The output end is for outputting the output voltage. The feedback circuit is configured to provide a reference voltage associated with the feedback voltage by voltage-dividing the output voltage according to a specific ratio. The adjusting unit is configured to adjust the specific ratio according to a load of the output end.

The present invention also provides a power conversion method with a power-saving mechanism for driving a load by converting an input voltage received at an input end into an output voltage outputted at an output end. The power conversion method includes determining a load coupled to the output end; adjusting a specific ratio according to the; providing a feedback voltage by voltage-dividing the output voltage according to the specific ratio; and adjusting a power conversion ratio of an inverter according to the feedback voltage; and converting the input voltage into the output voltage according to the power conversion ratio using the inverter.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
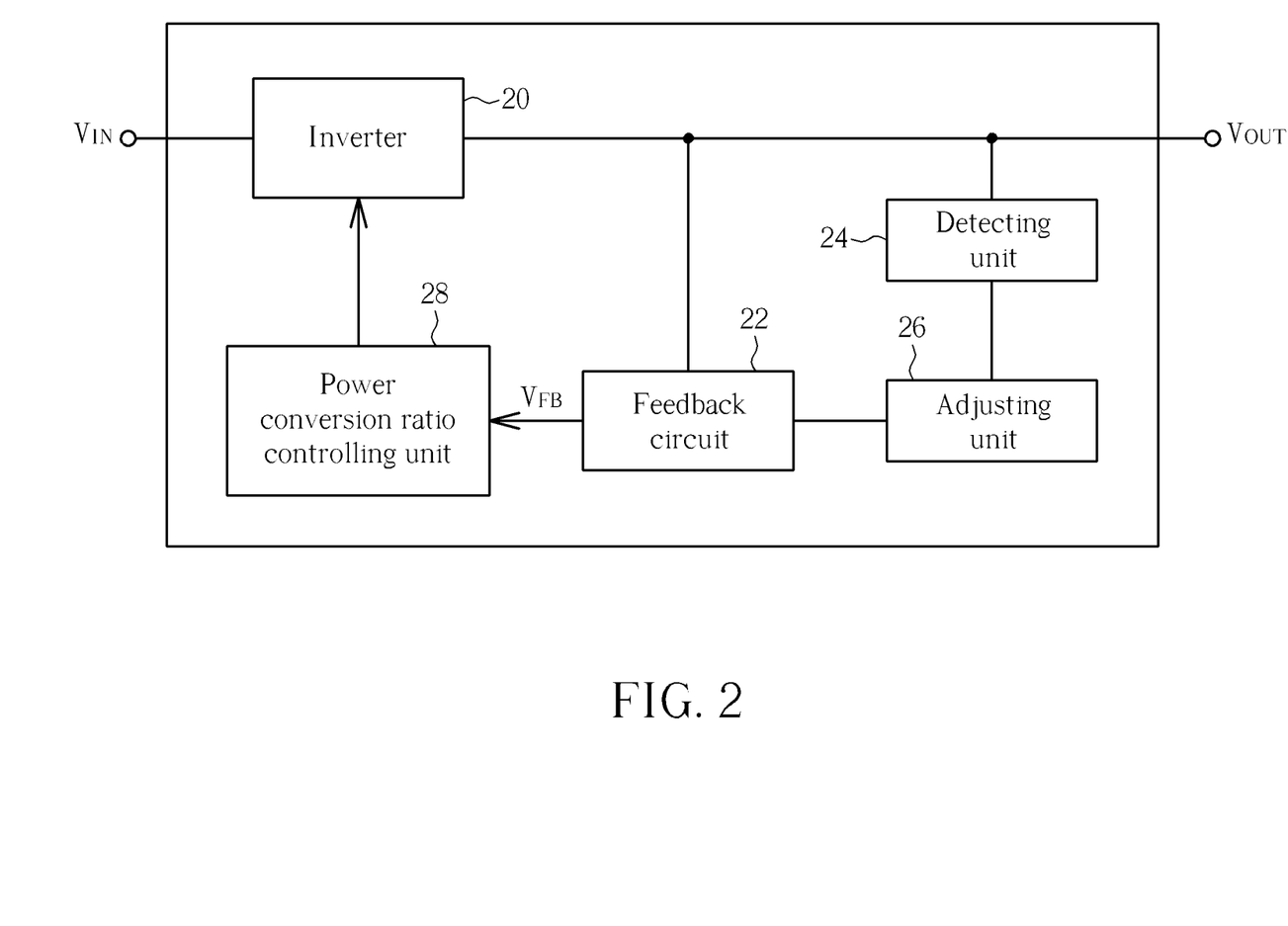
FIG. 2 is a function diagram illustrating a power adaptor with a power-saving mechanism according to the present invention.

FIG. 2 is a functional diagram illustrating a power adaptor with a power-saving mechanism according to the present invention. The power adaptor of the present invention is configured to convert an input voltage $V_{IN}$ into an output voltage $V_{OUT}$, and includes an inverter 20, a feedback circuit 22, a detecting unit 24, an adjusting unit 26, and a power conversion ratio controlling unit 28.

The inverter 20 is configured to convert the input voltage $V_{IN}$ into the output voltage $V_{OUT}$ according to a specific power conversion ratio. The feedback circuit 22 is configured to provide a feedback voltage $V_{FB}$ by voltage-dividing the output voltage $V_{OUT}$ according to an adjustable specific voltage-dividing ratio. The detecting unit 24 is configured to determine the loading variation of the output end by monitoring the output voltage $V_{OUT}$. The adjusting unit 26 is configured to adjust the specific voltage-dividing ratio according to the loading variation, thereby adjusting the feedback voltage $V_{FB}$. The power conversion ratio controlling unit 28 is configured to adjust the power conversion ratio of the inverter 20 according to the feedback voltage $V_{FB}$. When the load of the power converter decreases, the required power of the output end also decreases accordingly. The power conversion ratio of the inverter 20 may thus be adjusted for lowering the output voltage $V_{OUT}$, thereby reducing power consumption in the power-saving mode. When the load of the power converter increases, the required power of the output end also increases accordingly. The power conversion ratio of the inverter 20 may thus be adjusted for raising the output voltage $V_{OUT}$, thereby providing sufficient power in the normal mode.

FIGS. 3-6 are diagrams illustrating power adaptors 201-204 according to the embodiments of the present invention. In the power adaptors 201-204, the inverter 20 includes a first winding coil N1 disposed on a primary side and a second winding coil N2 disposed on a secondary side. The feedback circuit 22 includes a first resistor R1, a second resistor R2, a photo-coupling unit PH, and a three-terminal voltage stabilizer $Z_F$. The first resistor R1 and the second resistor R2 form a voltage-diving circuit which is configured to provide the feedback voltage $V_{FB}$ by voltage-dividing the output voltage $V_{OUT}$ according to the voltage-dividing ratio K of the feedback circuit 22, wherein $V_{FB}=V_{OUT}*K$. The three-terminal voltage stabilizer $Z_F$ is configured to stabilize the feedback voltage $V_{FB}$ for driving the photo-coupling unit PH, which can thus output a reference voltage $V_{REF}$ associated with the feedback voltage $V_{FB}$ to the power conversion ratio controlling unit 28. The power conversion ratio controlling unit 28 includes a pulse width modulation control unit PWM and a transistor switch SW0. The pulse width modulation control unit PWM is configured to output a switch control signal $V_{PWM}$ according to the reference voltage $V_{REF}$ for operating the transistor switch SW0. When the transistor switch SW0 is turned on, the energy of the input voltage $V_{IN}$ may be stored in the first winding coil N1 of the inverter 20. When the transistor switch SW0 is turned off, the energy stored in the first winding coil N1 may be transferred to the second winding coil N2 for providing the output voltage $V_{OUT}$. In other words, the pulse width modulation control unit PWM is configured to adjust the duty cycle of the transistor switch SW0 according to the reference voltage $V_{REF}$ associated with the feedback voltage $V_{FB}$. The power conversion ratio of the inverter 20 may thus be adjusted by increasing or decreasing the amount of power transferred to the secondary side.

Figure 3:
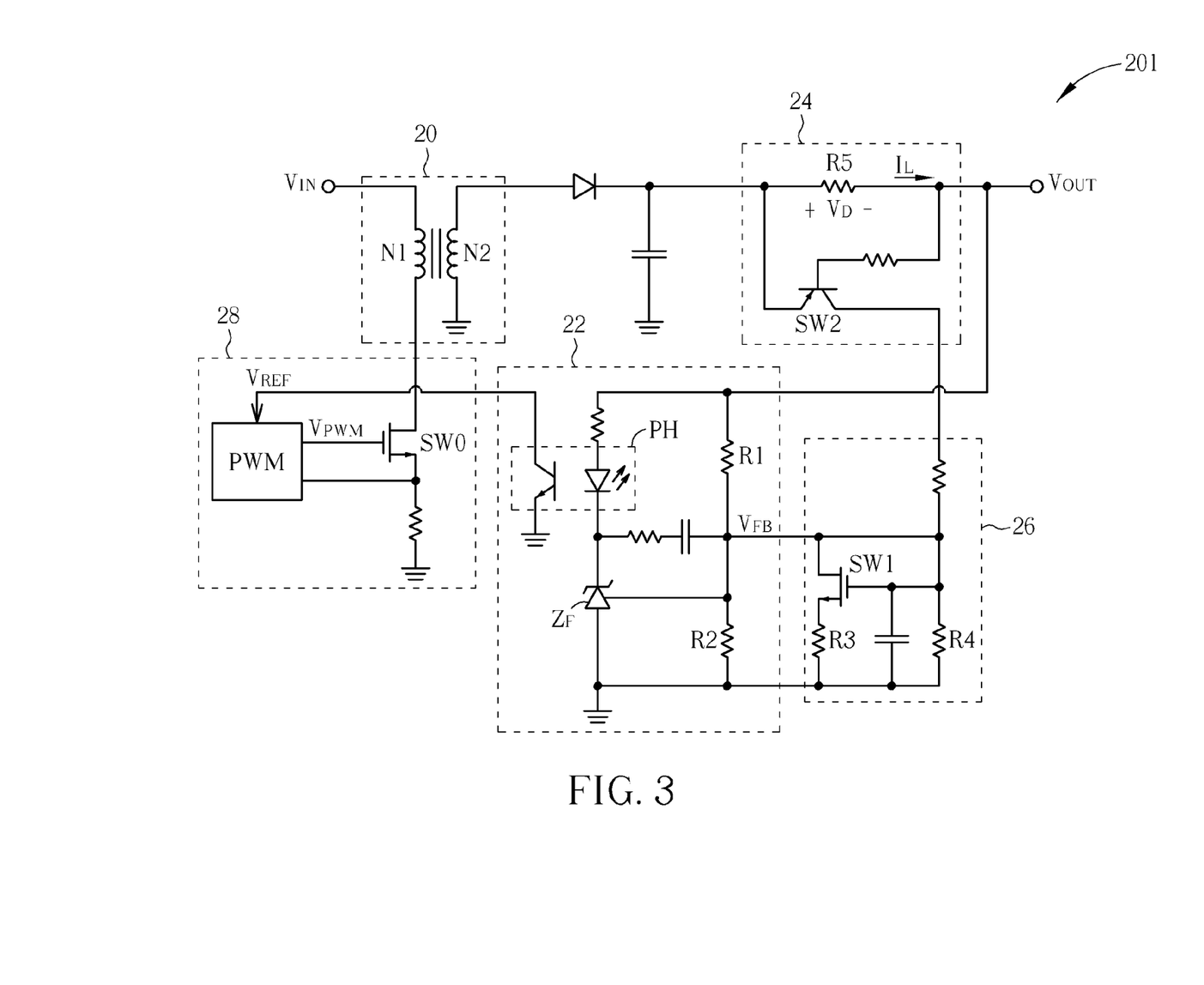
FIGS. 3-6 are diagrams illustrating embodiments of the power adaptor according to the present invention.

In the power adaptor 201 according to a first embodiment of the present invention depicted in FIG. 3, the detecting unit 24 is coupled between the second winding coil N2 and the output voltage $V_{OUT}$ and includes a resistor R5 and a transistor switch SW2. The transistor switch SW2 may be turned on or off according to a voltage $V_D$ established across the resistor R5. The adjusting unit 26 includes resistors R3-R4 and a transistor switch SW1. When the required power load of the output end decreases as the load of the power adaptor 201 decreases, the voltage $V_D$ established across the resistor R5 by the loading current $I_L$ is insufficient for conducting the transistor switch SW2 and the voltage established across the resistor R4 by the loading current $I_L$ is insufficient for conducting the transistor switch SW1. Under such circumstances, the adjusting unit 26 does not function and the voltage-dividing ratio $K_L$ of the feedback circuit 22 when light-loaded is R2/(R1+R2). When the required power of the output end increases as the load of the power adaptor 201 increases, the voltage $V_D$ established across the resistor R5 by the loading current $I_L$ gradually increases. When the voltage $V_D$ becomes sufficiently large for conducting the transistor switch SW2, the adjusting unit 26 may be electrically connected to the output voltage $V_{OUT}$, thereby increasing the voltage established across the resistor R4 accordingly. When the voltage established across the resistor R4 becomes sufficiently large for conducting the transistor switch SW1, the adjusting unit 26 begins to function and couple the resistor R3 in parallel with the resistor R2. Therefore, the voltage-dividing ratio $K_H$ of the feedback circuit 22 when heavy-loaded is R2/(R1+R2'), wherein $$\frac{1}{R2'} = \frac{1}{R2} + \frac{1}{R3}.$$

Since R2>R2', thus $K_L<K_H$, resulting in a larger feedback voltage when heavy-loaded and a smaller feedback voltage when light-loaded. After receiving the corresponding reference voltage, the pulse width modulation control unit PWM is configured to shorten the duty cycle of the transistor switch SW1 for reducing the output voltage when light-loaded and increase the duty cycle of the transistor switch SW1 for raising the output voltage when heavy-loaded.

Figure 4:
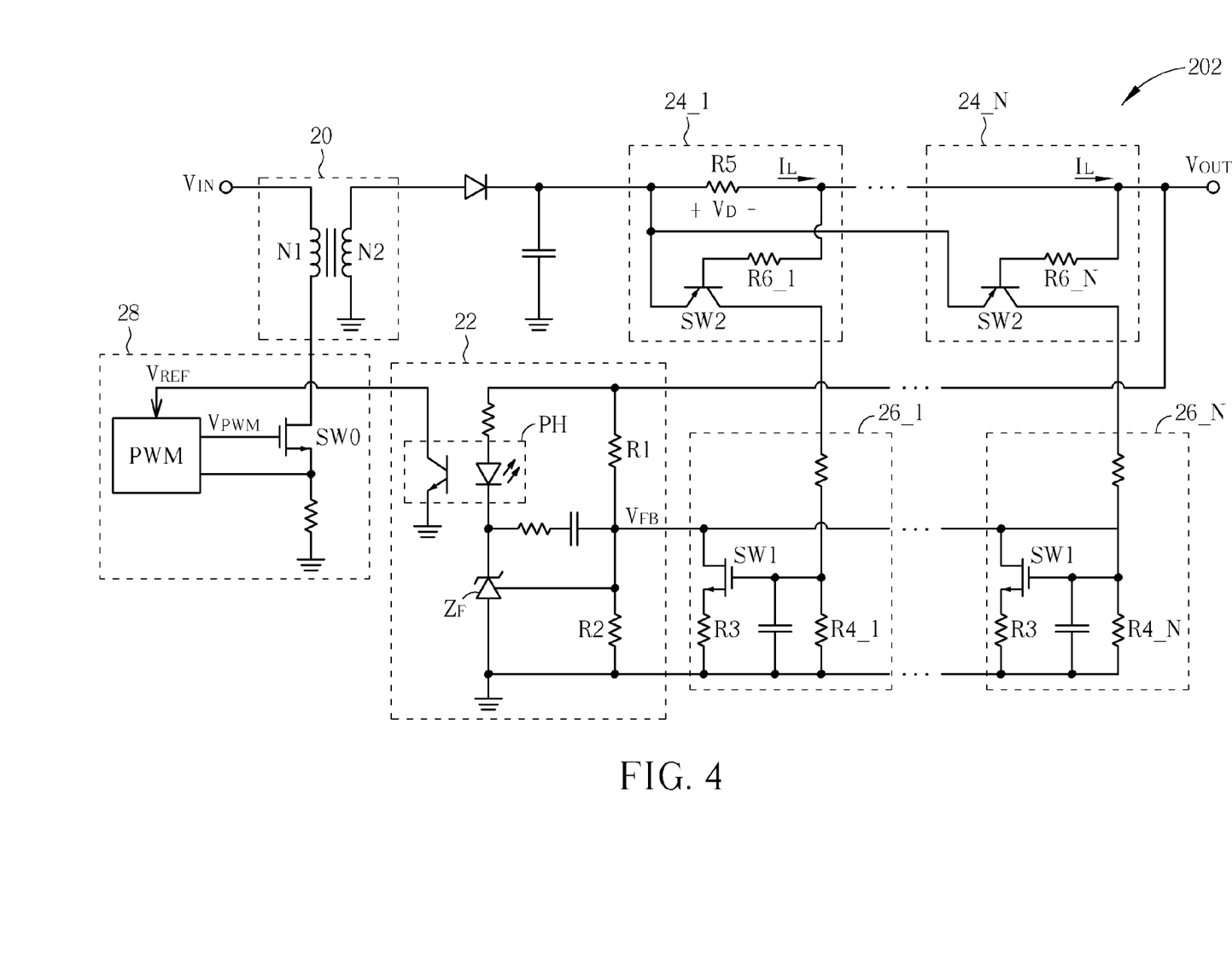

In the power adaptor 202 according to a second embodiment of the present invention depicted in FIG. 4, the power adaptor 202 includes a plurality of detecting units 24_1~24_N and a plurality of adjusting units 26_1~26_N having similar structure and operation as the detecting unit 24 and the adjusting unit 26 according to the first embodiment of the present invention. When the required power of the output end decreases as the load of the power adaptor 202 decreases, the voltages $V_D$ established across the resistors R5 of the detecting units 24_1~24_N by the loading current $I_L$ are insufficient for conducting the corresponding transistor switches SW2 and the voltages established across the resistors R4 of the adjusting units 26_1~26_N by the loading current $I_L$ are insufficient for conducting the corresponding transistor switches SW1. Under such circumstances, the adjusting units 26_1~26_N do not function and the voltage-dividing ratio $K_L$ of the feedback circuit 22 when light-loaded is R2/(R1+R2). When the required power of the output end increases as the load of the power adaptor 202 increases, the voltages $V_D$ established across the resistors R5 of the detecting units 24_1~24_n (n is an integer between 1 and N) by the loading current $I_L$ become sufficiently large for conducting the corresponding transistor switches SW2, the adjusting units 26_1~26_n may be electrically connected to the output voltage $V_{OUT}$, thereby increasing the voltages established across the resistors R4 accordingly. When the voltage established across the resistors R4 becomes sufficiently large for conducting the corresponding transistor switches SW1, the adjusting units 26_1~26_n begin to function and couple n resistors R3 in parallel with the corresponding resistors R2. Therefore, the voltage-dividing ratio $K_{Hn}$ of the feedback circuit 22 when heavy-loaded is R2/(R1+R2'), wherein $$\frac{1}{R2'} = \frac{1}{R2} + \frac{n}{R3}.$$

In other words, the amount of the resistors R3 coupled in parallel with the corresponding resistors R2 is associated with the value of the loading current $I_L$. In response to an increasing loading current $I_L$, n becomes larger so that the output voltage $V_{OUT}$ may be raised by increasing the voltage-dividing ratio of the feedback circuit 22. In response to a decreasing loading current $I_L$, n becomes smaller so that the output voltage $V_{OUT}$ may be reduced by decreasing the voltage-dividing ratio of the feedback circuit 22. Therefore, the power adaptor 202 according to the second embodiment of the present invention provides a multi-stage feedback control which is configured to dynamically adjust the output voltage $V_{OUT}$ according to loading variations.

Figure 5:
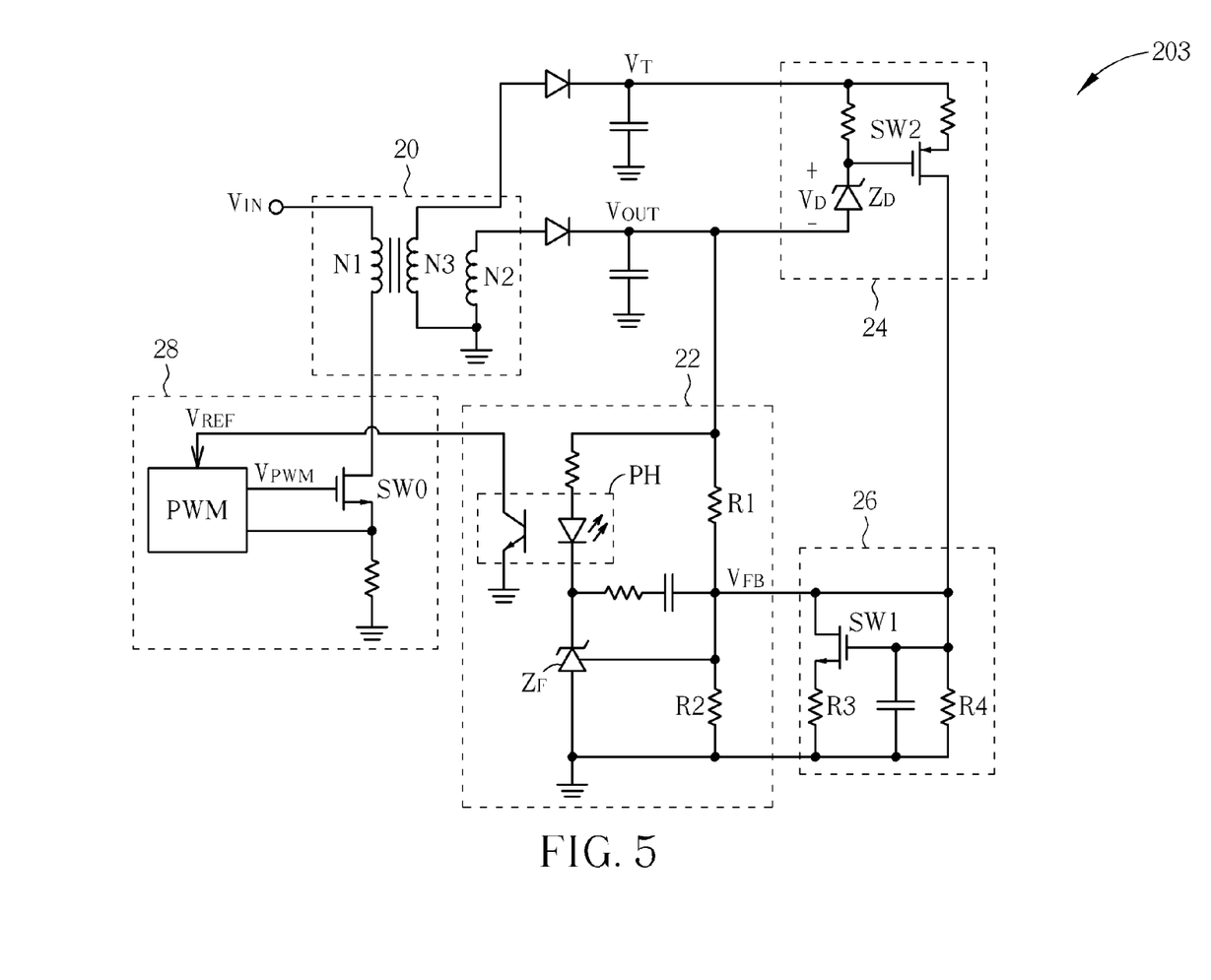

In the power adaptor 203 according to a third embodiment of the present invention depicted in FIG. 5, the inverter 20 further includes a third winding coil N3 disposed on the secondary side. By monitoring the energy of the first winding coil N1, the second winding N2 may provide the output voltage $V_{OUT}$ and the third winding N3 may provide a comparing voltage $V_T$. The detecting unit 24, coupled to the second winding N2, the third winding coil N3 and the output voltage $V_{OUT}$, includes a diode $Z_D$ and a transistor switch SW2. The transistor switch SW2 may be turned on or off according to a voltage difference $V_D$ between the output voltage $V_{OUT}$ and the comparing voltage $V_T$. When the required power of the output end decreases as the load of the power adaptor 203 decreases, the voltage difference $V_D$ is insufficient for conducting the transistor switch SW2 and the voltage established across the resistor R4 is insufficient for conducting the transistor switch SW1. Under such circumstances, the adjusting unit 26 does not function and the voltage-dividing ratio $K_L$ of the feedback circuit 22 when light-loaded is R2/(R1+R2). When the required power of the output end increases as the load of the power adaptor 203 increases, the voltage difference $V_D$ gradually increases. When the voltage difference $V_D$ becomes sufficiently large for conducting the transistor switch SW2, the adjusting unit 26 may be electrically connected to the output voltage $V_{OUT}$, thereby increasing the voltage established across the resistor R4 accordingly. When the voltage established across the resistor R4 becomes sufficiently large for conducting the transistor switch SW1, the adjusting unit 26 begins to function and couple the resistor R3 in parallel with the resistor R2. Therefore, the voltage-dividing ratio $K_H$ of the feedback circuit 22 when heavy-loaded is R2/(R1+R2'), wherein $$\frac{1}{R2'} = \frac{1}{R2} + \frac{1}{R3}.$$

Since R2>R2', thus $K_L<K_H$, resulting in a larger feedback voltage when heavy-loaded and a smaller feedback voltage when light-loaded. After receiving the corresponding reference voltage, the pulse width modulation control unit PWM is configured to shorten the duty cycle of the transistor switch SW1 for reducing the output voltage when light-loaded and increase the duty cycle of the transistor switch SW1 for raising the output voltage when heavy-loaded.

Figure 6:
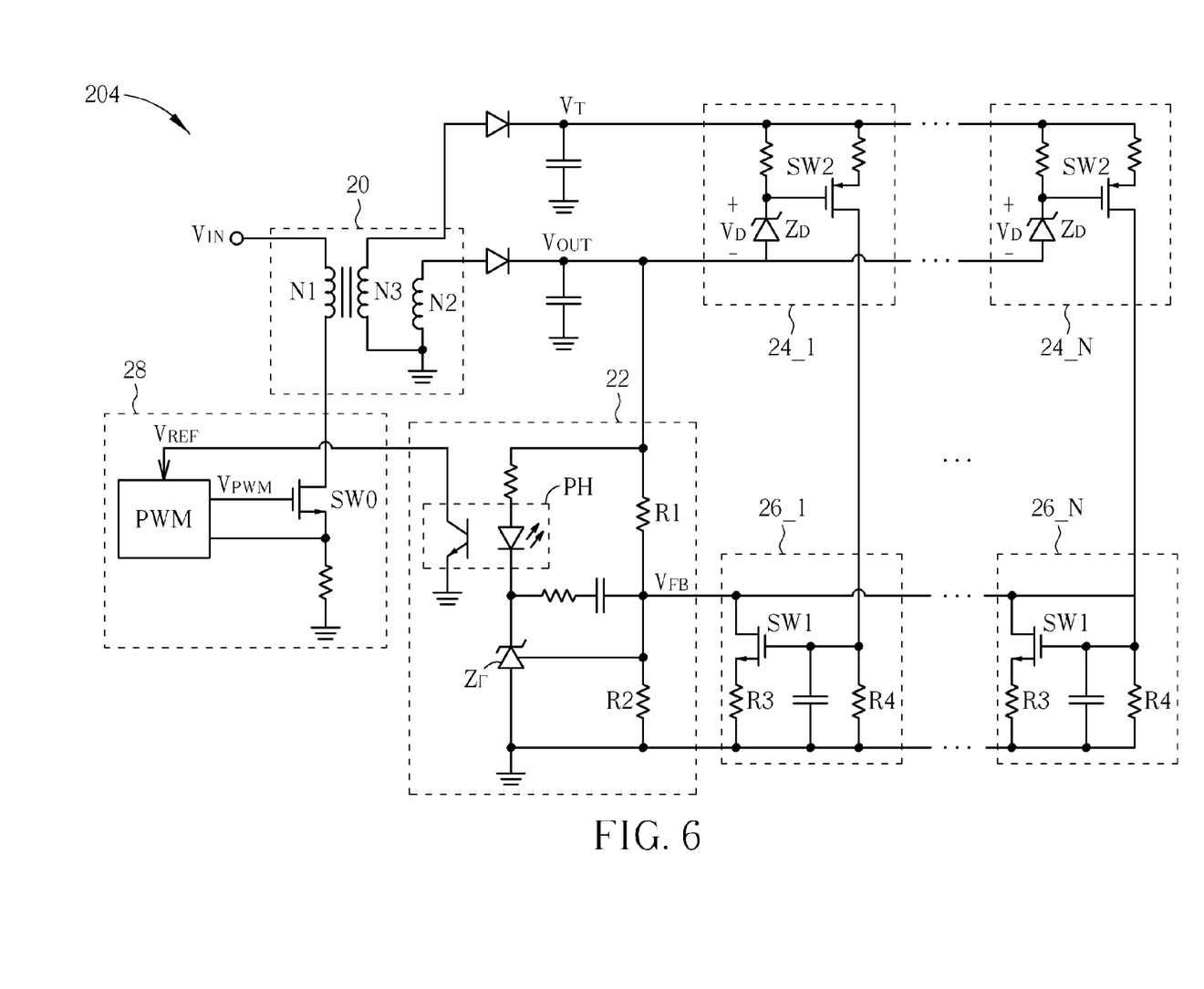

In the power adaptor 204 according to a fourth embodiment of the present invention depicted in FIG. 6, the power adaptor 204 includes a plurality of detecting units 24_1~24_N and a plurality of adjusting units 26_1~26_N having similar structure and operation as the detecting unit 24 and the adjusting unit 26 according to the third embodiment of the present invention. When the required power of the output end decreases as the load of the power adaptor 204 decreases, the voltage difference $V_D$ between the output voltage $V_{OUT}$ and the comparing voltage $V_T$ is insufficient for conducting the corresponding transistor switches SW2 of the detecting units 24_1~24_N and the voltages established across the resistors R4 of the adjusting units 26_1~26_N are insufficient for conducting the corresponding transistor switches SW1. Under such circumstances, the adjusting units 26_1~26_N do not function and the voltage-dividing ratio $K_L$, of the feedback circuit 22 when light-loaded is R2/(R1+R2). When the required power of the output end increases as the load of the power adaptor 204 increases, the voltages difference $V_D$ becomes sufficiently large for conducting the transistor switches SW2 of the detecting units 24_1~24_N (n is an integer between 1 and N), the adjusting units 26_1~26_n may be electrically connected to the output voltage $V_{OUT}$, thereby increasing the voltages established across the resistors R4 accordingly. When the voltage established across the resistors R4 becomes sufficiently large for conducting the corresponding transistor switches SW1, the adjusting units 26_1~26_n begin to function and couple n resistors R3 in parallel with the corresponding resistors R2. Therefore, the voltage-dividing ratio $K_{Hn}$ of the feedback circuit 22 when heavy-loaded is R2/(R1+R2'), wherein $$\frac{1}{R2'} = \frac{1}{R2} + \frac{n}{R3}.$$

In other words, the amount of the resistors R3 coupled in parallel with the corresponding resistors R2 is associated with the value of the required power at the output end (the voltage difference $V_D$ between the output voltage $V_{OUT}$ and the comparing voltage $V_T$). In response to an increasing voltage difference $V_D$, n becomes larger so that the output voltage $V_{OUT}$ may be raised by increasing the voltage-dividing ratio of the feedback circuit 22. In response to a decreasing voltage difference $V_D$, n becomes smaller so that the output voltage $V_{OUT}$ may be reduced by decreasing the voltage-dividing ratio of the feedback circuit 22. Therefore, the power adaptor 204 according to the fourth embodiment of the present invention provides a multi-stage feedback control which is configured to dynamically adjust the output voltage $V_{OUT}$ according to loading variations.

The present power adaptor is configured to detect the load of its output end and dynamically adjust the output voltage according to loading variations. Therefore, the present invention may reduce excessive power consumption when light-loaded and provide sufficient power for maintaining system efficiency when heavy-loaded.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power adaptor with a power-saving mechanism, comprising:
   an inverter configured to convert an input voltage into an output voltage according to a power conversion ratio and adjust the power conversion ratio according to a feedback voltage associated with the output voltage, the inverter comprising:
      a first winding coil disposed on a primary side of the power adaptor for receiving the input voltage; and
      a second winding coil disposed on a secondary side of the power adaptor for providing the output voltage;
   an output end for outputting the output voltage;
   a feedback circuit configured to provide a reference voltage associated with the feedback voltage by voltage-dividing the output voltage according to a specific ratio, the feedback circuit comprising:
      a first resistor and a second resistor coupled in series between an input end of the feedback circuit and a ground for determining the specific ratio;
      a photo-coupling unit coupled in parallel with the first resistor for providing the reference voltage; and
      a three-terminal voltage stabilizer for driving the photo-coupling unit according to the specific ratio;
   an adjusting unit comprising:
      a first switch including:
         a control end;
         a first end coupled between the first resistor and the second resistor; and
         a second end; and
      a third resistor coupled between the second end of the first switch and the ground, the adjusting unit configured to adjust the specific ratio according to a loading variation of the output end by coupling the third resistor in parallel with the second resistor when a voltage established across an impedance unit is greater than a predetermined value; and
   a detecting unit coupled between the adjusting unit and the output end and configured to determine the loading variation according to the output voltage or a loading current flowing through the output end, the detecting unit comprising:
      a second switch including:
         a control end coupled to the output end;
         a first end coupled to the second winding coil; and
         a second end coupled to the control end of the first switch; and
      the impedance unit coupled between the control end of the second switch and the first end of the second switch.

2. The power adaptor of claim 1, wherein the input end of the feedback circuit is coupled to the first end of the second switch.

3. The power adaptor of claim 1, wherein:
the inverter further comprises a third winding coil disposed on the secondary side of the power adaptor for providing a comparing voltage;
the adjusting unit is configured to adjust the specific ratio by coupling the third resistor in parallel with the second resistor when detecting that the comparing voltage is greater than then the output voltage by the predetermined value; and
the feedback circuit is further configured to provide a first adjusted output voltage by increasing the feedback voltage according to the adjusted specific ratio.

4. The power adaptor of claim 3, wherein:
the detecting unit further comprises a diode coupled between the output voltage and the comparing voltage; and
the feedback circuit is further configured to provide a second adjusted output voltage larger than the first adjusted output voltage by increasing the feedback voltage according to the adjusted specific ratio.

5. A power conversion method with a power-saving mechanism for driving a load by converting an input voltage received at an input end into an output voltage outputted at an output end, the power conversion method comprising:
providing a first winding coil coupled to the input end for receiving the input voltage;
providing a second winding coil coupled to the output end for providing the output voltage;
providing a third winding coil coupled to the output end for providing a comparing voltage;
providing a first resistor and a second resistor coupled in series between the input end and a ground for determining a specific ratio;
providing a photo-coupling unit coupled in parallel with the first resistor for providing a reference voltage associated with a feedback voltage;
providing a three-terminal voltage stabilizer for driving the photo-coupling unit according to the specific ratio;
determining a loading variation associated with the load;
providing the feedback voltage by voltage-dividing the output voltage according to the specific ratio;
adjusting the specific ratio according to the loading variation by coupling a third resistor in parallel with the second resistor when detecting that the comparing voltage is greater than then the output voltage by a predetermined value;
adjusting a power conversion ratio of an inverter according to the feedback voltage;
converting the input voltage into the output voltage according to the power conversion ratio using the inverter; and
generating a first adjusted output voltage by increasing the feedback voltage according to the adjusted specific ratio.

6. The power conversion method of claim 5, further comprising:
determining the loading variation by detecting the output voltage or a loading current flowing through the output end.

7. The power conversion method of claim 5, further comprising:
providing an impedance unit for detecting the loading current; and
adjusting the specific ratio by coupling the third resistor in parallel with the second resistor when a voltage established across the impedance unit is greater than the predetermined value.

8. The power conversion method of claim 5, further comprising:
providing a diode coupled between the output voltage and the comparing voltage;
and
generating a second adjusted output voltage larger than the first adjusted output voltage by increasing the feedback voltage according to the adjusted specific ratio.

9. A power adaptor with a power-saving mechanism, comprising:
an inverter configured to convert an input voltage into an output voltage according to a power conversion ratio and adjust the power conversion ratio according to a feedback voltage associated with the output voltage, the inverter comprising:
a first winding coil disposed on a primary side of the power adaptor for receiving the input voltage;
a second winding coil disposed on a secondary side of the power adaptor for providing the output voltage; and
a third winding coil disposed on the secondary side of the power adaptor for providing a comparing voltage;
an output end for outputting the output voltage;
a feedback circuit configured to provide a reference voltage associated with the feedback voltage by voltage-dividing the output voltage according to a specific ratio and provide a first adjusted output voltage by increasing the feedback voltage according to the adjusted specific ratio, the feedback circuit comprising:
a first resistor and a second resistor coupled in series between an input end of the feedback circuit and a ground for determining the specific ratio;
a photo-coupling unit coupled in parallel with the first resistor for providing the reference voltage; and
a three-terminal voltage stabilizer for driving the photo-coupling unit according to the specific ratio;
an adjusting unit configured to adjust the specific ratio according to a loading variation of the output end by coupling a third resistor in parallel with the second resistor when detecting that the comparing voltage is greater than then the output voltage by a predetermined value; and
a detecting unit coupled between the adjusting unit and the output end and configured to determine the loading variation according to the output voltage or a loading current flowing through the output end.

10. The power adaptor of claim 9, wherein:
the detecting unit further comprises a diode coupled between the output voltage and the comparing voltage;
the adjusting unit comprise the third resistor; and
the feedback circuit is further configured to provide a second adjusted output voltage larger than the first adjusted output voltage by increasing the feedback voltage according to the adjusted specific ratio.

11. A power adaptor with a power-saving mechanism, comprising:
an inverter configured to convert an input voltage into an output voltage according to a power conversion ratio and adjust the power conversion ratio according to a feedback voltage associated with the output voltage, the inverter comprising:
a first winding coil disposed on a primary side of the power adaptor for receiving the input voltage; and
a second winding coil disposed on a secondary side of the power adaptor for providing the output voltage;
an output end for outputting the output voltage;
a feedback circuit configured to provide a reference voltage associated with the feedback voltage by voltage-dividing the output voltage according to a specific ratio, the feedback circuit comprising:
  a first resistor and a second resistor coupled in series between an input end of the feedback circuit and a ground for determining the specific ratio;
  a photo-coupling unit coupled in parallel with the first resistor for providing the reference voltage; and
  a three-terminal voltage stabilizer for driving the photo-coupling unit according to the specific ratio;
a plurality of adjusting units selectively coupled to the feedback circuit and configured to adjust the specific ratio in n steps by coupling n third resistors in parallel with the second resistor according to a loading variation of the output end, wherein
  the specific ratio is equal to $R2/(R1+R2)$ when the power adaptor is light-loaded;
  the specific ratio is equal to $R2/(R1+R2')$ when the power adaptor is heavy-loaded;
  R1 represents resistance of the first resistor;
  R2 represents resistance of the second resistor;
  R3 represents resistance of the third resistor;
  n is an integer larger than 1; and
  $(1/R2')=(1/R2)+(n/R3)$.

12. The power adaptor of claim 11, wherein:
the adjusting unit comprises:
  a first switch including:
    a control end;
    a first end coupled between the first resistor and the second resistor; and
    a second end; and
  the third resistor coupled between the second end of the first switch and the ground; and
the detecting unit further comprises:
  a second switch including:
    a control end coupled to the output end;
    a first end coupled to the second winding coil; and
    a second end coupled to the control end of the first switch; and
the impedance unit is coupled between the control end and the first end of the second switch.

13. The power adaptor of claim 11, wherein:
the inverter further comprises a third winding coil disposed on the secondary side of the power adaptor for providing a comparing voltage;
the adjusting unit is configured to adjust the specific ratio by coupling at least one of the n third resistors in parallel with the second resistor when detecting that the comparing voltage is greater than then the output voltage by a predetermined value; and
the feedback circuit is configured to provide a first adjusted output voltage by increasing the feedback voltage according to the adjusted specific ratio.

* * * * *